United States Patent
Yamada et al.

(10) Patent No.: US 11,629,969 B2
(45) Date of Patent: Apr. 18, 2023

(54) VISITING DESTINATION PREDICTION DEVICE AND VISITING DESTINATION PREDICTION METHOD

(71) Applicant: NTT DOCOMO, INC., Chiyoda-ku (JP)

(72) Inventors: Masato Yamada, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 130 days.

(21) Appl. No.: 17/046,928

(22) PCT Filed: Jan. 8, 2019

(86) PCT No.: PCT/JP2019/000243
§ 371 (c)(1),
(2) Date: Oct. 12, 2020

(87) PCT Pub. No.: WO2019/202786
PCT Pub. Date: Oct. 24, 2019

(65) Prior Publication Data
US 2021/0048307 A1 Feb. 18, 2021

(30) Foreign Application Priority Data
Apr. 18, 2018 (JP) .............................. JP2018-079813

(51) Int. Cl.
*G01C 21/36* (2006.01)
(52) U.S. Cl.
CPC ..... *G01C 21/3617* (2013.01); *G01C 21/3679* (2013.01)
(58) Field of Classification Search
CPC ............ G01C 21/3617; G01C 21/3679; G01C 21/3492; G01C 21/3611; G06F 16/90348;
(Continued)

(56) References Cited

U.S. PATENT DOCUMENTS 8,738,422 B2 * 5/2014 Lerner ................. G06Q 10/047
 701/1
10,402,455 B1 * 9/2019 Phanse ............... G01C 21/3611
(Continued)

FOREIGN PATENT DOCUMENTS

JP 2008-26259 A 2/2008
JP 2008026259 A * 2/2008
(Continued)

OTHER PUBLICATIONS

Yamada Kazunao, Vehicle Arrival Determination Device, and Vehicle Control System, 2008 (Year: 2008).*
(Continued)

*Primary Examiner* — Babar Sarwar
(74) *Attorney, Agent, or Firm* — Oblon, McClelland, Maier & Neustadt, L.L.P.

(57) ABSTRACT

A visiting destination prediction device includes: a user position information acquiring unit configured to acquire user position information indicating a position of a user; a stationary position deriving unit configured to derive a stationary position of the user on the basis of the acquired user position information; and a visiting POI estimating unit configured to estimate a visiting POI which is a visiting destination of the user on the basis of a relationship between the derived stationary position of the user and a predetermined POI position of a POI which is able to be the visiting destination of the user. The stationary position deriving unit derives the stationary position which is expressed by an area on the basis of an error and a degree of dispersion of a series of pieces of the acquired user position information.

7 Claims, 7 Drawing Sheets

(58) Field of Classification Search
CPC . G06F 16/9035; G06F 16/909; G06F 16/9537
See application file for complete search history.

(56) References Cited

U.S. PATENT DOCUMENTS

| | | | | |
|---|---|---|---|---|
| 2006/0149684 | A1* | 7/2006 | Matsuura | G06Q 30/06 705/65 |
| 2017/0223504 | A1* | 8/2017 | Miller | H04L 67/327 |
| 2017/0322032 | A1* | 11/2017 | Friedler | G01C 21/20 |
| 2017/0353827 | A1* | 12/2017 | D'Alberto | G06Q 30/0267 |

FOREIGN PATENT DOCUMENTS

| | | |
|---|---|---|
| JP | 2012-167970 A | 9/2012 |
| KR | 101687793 B1 * | 7/2010 |

OTHER PUBLICATIONS

Lee Hye-min, Method and Apparatus for Providing Position Information by Using Error Range (Year: 2010).*

International Preliminary Report on Patentability and Written Opinion dated Oct. 29, 2020 in PCT/JP2019/000243 (submitting English translation only), 6 pages.

International Search Report dated Apr. 16, 2019 in PCT/JP2019/000243 filed on Jan. 8, 2019, citing document AP therein, 2 pages.

Japanese Office Action dated Dec. 6, 2022, issued in Japanese Patent Application No. 2020-513966 (with English translation).

* cited by examiner

(a) POSITIONING POINT TABLE — 11

| DATA ITEM |
|---|
| LATITUDE: lat_i |
| LONGITUDE: lng_i |
| POSITIONING TIME: time_i |
| POSITIONING ERROR: acc_i |
| USER ID: u |

(b) STATIONARY POSITION TABLE — 14

| DATA ITEM |
|---|
| STATIONARY POSITION ID: sid |
| CENTER LATITUDE: lat_C |
| CENTER LONGITUDE: lng_C |
| STAY START TIME: bt |
| STAY END TIME: et |
| CONSTITUENT POSITION INFORMATION LIST: P |
| STATIONARY AREA: lat_Cm, lng_Cm, lat_Cp, lng_Cp |
| USER ID: u |

(c) VISITING POI TABLE — 17

| DATA ITEM |
|---|
| CORRESPONDING STATIONARY POSITION ID: sid |
| POI_ID OF VISITING POI: pid |
| SCORE OF VISITING POI: pscore |
| POI_ID OF VISITING POI (CHILD): pcid |
| SCORE OF VISITING POI (CHILD): pcscore |

(d) POI MASTER TABLE — 15

| DATA ITEM |
|---|
| POI_ID: pid |
| POI NAME: pname |
| POI CATEGORY ID: pcat |
| POI POPULARITY RATING: pop |
| LATITUDE: plat |
| LONGITUDE: plng |
| AREA: pshape |

VISITING DESTINATION PREDICTION DEVICE AND VISITING DESTINATION PREDICTION METHOD

TECHNICAL FIELD

The invention relates to a visiting destination prediction device and a visiting destination prediction method for predicting a visiting destination of a user.

BACKGROUND ART

A technique of storing, in advance, positions of facilities (POI) which can be visiting destinations of a user, acquiring position information indicating a position of the user, and predicting a visiting POI which is a visiting destination of the user on the basis of a relationship between a user position indicated by the position information and a position of a POI (for example, a distance therebetween) is known. For example, Patent Literature 1 proposes a technique for a navigation device that notifies a user who moves in a vehicle of the presence of a guidance object (for example, a facility) near the user on the premise of movement of the user.

The technique described in Patent Literature 1 is based on the premise of movement of a user, and a technique of predicting a visiting destination (a visiting POI) of a user on the basis of a relationship between a stationary position of a user and a position of a POI without being based on the premise of movement of the user has not been studied much yet. In the related art, a stationary position of a user is considered as a point and facilities located near the point are extracted as candidates for a visiting POI.

CITATION LIST

Patent Literature

[Patent Literature 1] Japanese Patent Application Publication No. 2012-167970

SUMMARY OF INVENTION

Technical Problem

There is an error in position information which serves as a basis for calculating a stationary position of a user. Accordingly, when a stationary position of a user is considered as a point and facilities near the point are extracted as candidates for a visiting POI, there is a problem in that it is difficult to accurately extract candidates for a visiting POI due to an error in position information and an appropriate extraction range is not known.

Therefore, an objective of the invention is to avoid a problem when a stationary position of a user is considered as a point and facilities near the point are extracted as candidates for a visiting POI and to accurately predict a visiting POI.

Solution to Problem

A visiting destination prediction device according to an embodiment of the invention includes: a user position information acquiring unit configured to acquire user position information indicating a position of a user; a stationary position deriving unit configured to derive a stationary position of the user on the basis of the user position information acquired by the user position information acquiring unit; and a visiting POI estimating unit configured to estimate a visiting POI which is a visiting destination of the user on the basis of a relationship between the stationary position of the user derived by the stationary position deriving unit and a predetermined POI position of a POI which is able to be the visiting destination of the user, and the stationary position deriving unit is configured to derive the stationary position which is expressed by an area on the basis of an error and a degree of dispersion of a series of pieces of the acquired user position information.

In the visiting destination prediction device, the user position information acquiring unit acquires user position information indicating a position of a user, the stationary position deriving unit derives a stationary position of the user on the basis of the acquired user position information, and the visiting POI estimating unit estimates a visiting POI which is a visiting destination of the user on the basis of a relationship between the stationary position of the user derived by the stationary position deriving unit and a predetermined POI position of a POI which is able to be the visiting destination of the user. Here, the stationary position deriving unit derives the stationary position which is expressed by an area on the basis of an error and a degree of dispersion of a series of pieces of the acquired user position information, and the visiting POI estimating unit estimates the visiting POI on the basis of the relationship between the stationary position which is expressed as an area and the POI position. In this way, by estimating a visiting POI on the basis of a relationship between a stationary position which is expressed as an area and a POI position, it is possible to avoid a problem when a stationary position of a user is considered as a point and facilities near the point are extracted as candidates for a visiting POI and to accurately predict a visiting POI as in the related art.

Advantageous Effects of Invention

According to the invention, it is possible to avoid a problem when a stationary position of a user is considered as a point and facilities near the point are extracted as candidates for a visiting POI and to accurately predict a visiting POI.

BRIEF DESCRIPTION OF DRAWINGS

FIG. 2(a) is a diagram schematically illustrating a positioning point table, FIG. 2(b) is a diagram schematically illustrating a stationary position table, FIG. 2(c) is a diagram schematically illustrating a visiting POI table, and FIG. 2(d) is a diagram schematically illustrating a POI master table.

FIG. 4(a) is a diagram illustrating premise details and FIG. 4(b) is a diagram illustrating derivation of a stationary position which is expressed as a stationary area.

FIG. 6(a) is a diagram illustrating premise details, FIG. 6(b) is a diagram illustrating a state in which a degree of dispersion of positioning points is great, FIG. 6(c) is a diagram illustrating a state in which an error is great, and FIG. 6(d) is a diagram illustrating a state in which positioning points with different errors are mixed.

DESCRIPTION OF EMBODIMENTS

Figure 1:
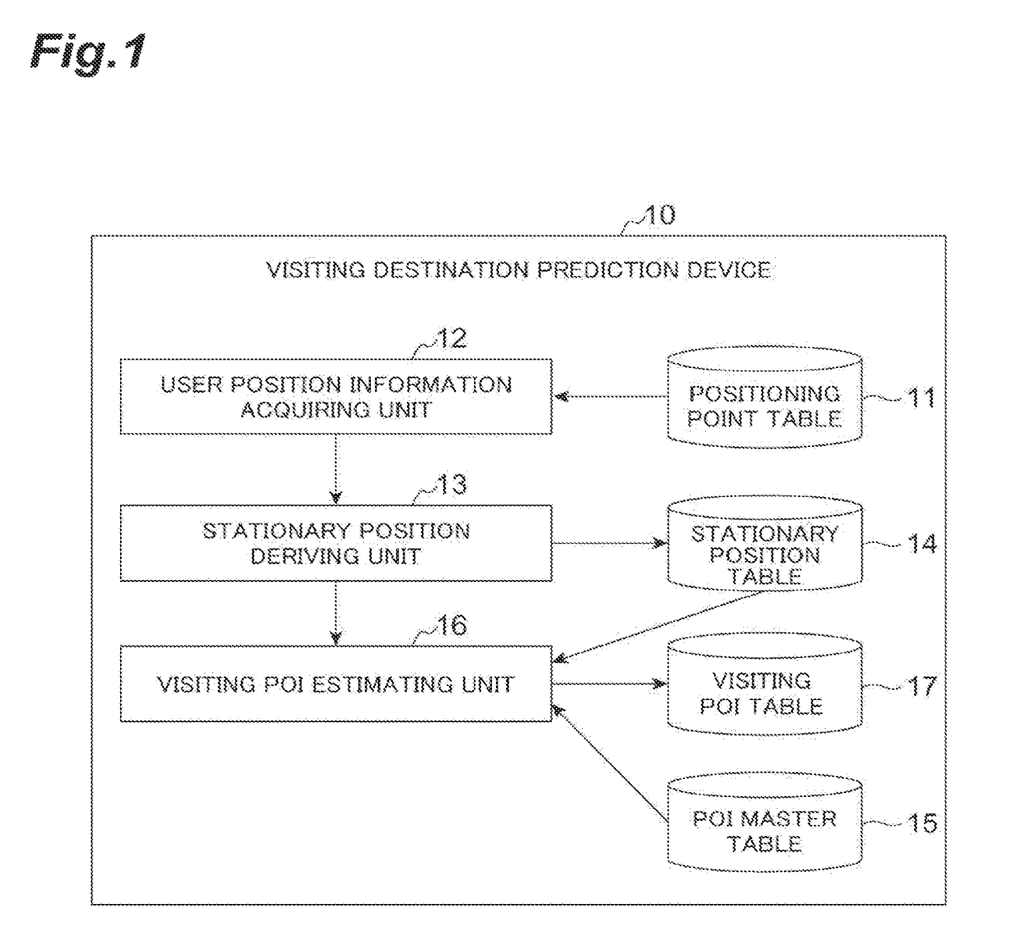
FIG. 1 is a functional block diagram illustrating a visiting destination prediction device according to an embodiment of the invention.

Hereinafter, an embodiment of the invention will be described with reference to the accompanying drawings.
[Configuration of Visiting Destination Prediction Device]
As illustrated in FIG. 1, a visiting destination prediction device 10 according to an embodiment includes a positioning point table 11, a user position information acquiring unit 12, a stationary position deriving unit 13, a stationary position table 14, a POI master table 15, a visiting POI estimating unit 16, and a visiting POI table 17.

Figure 2:
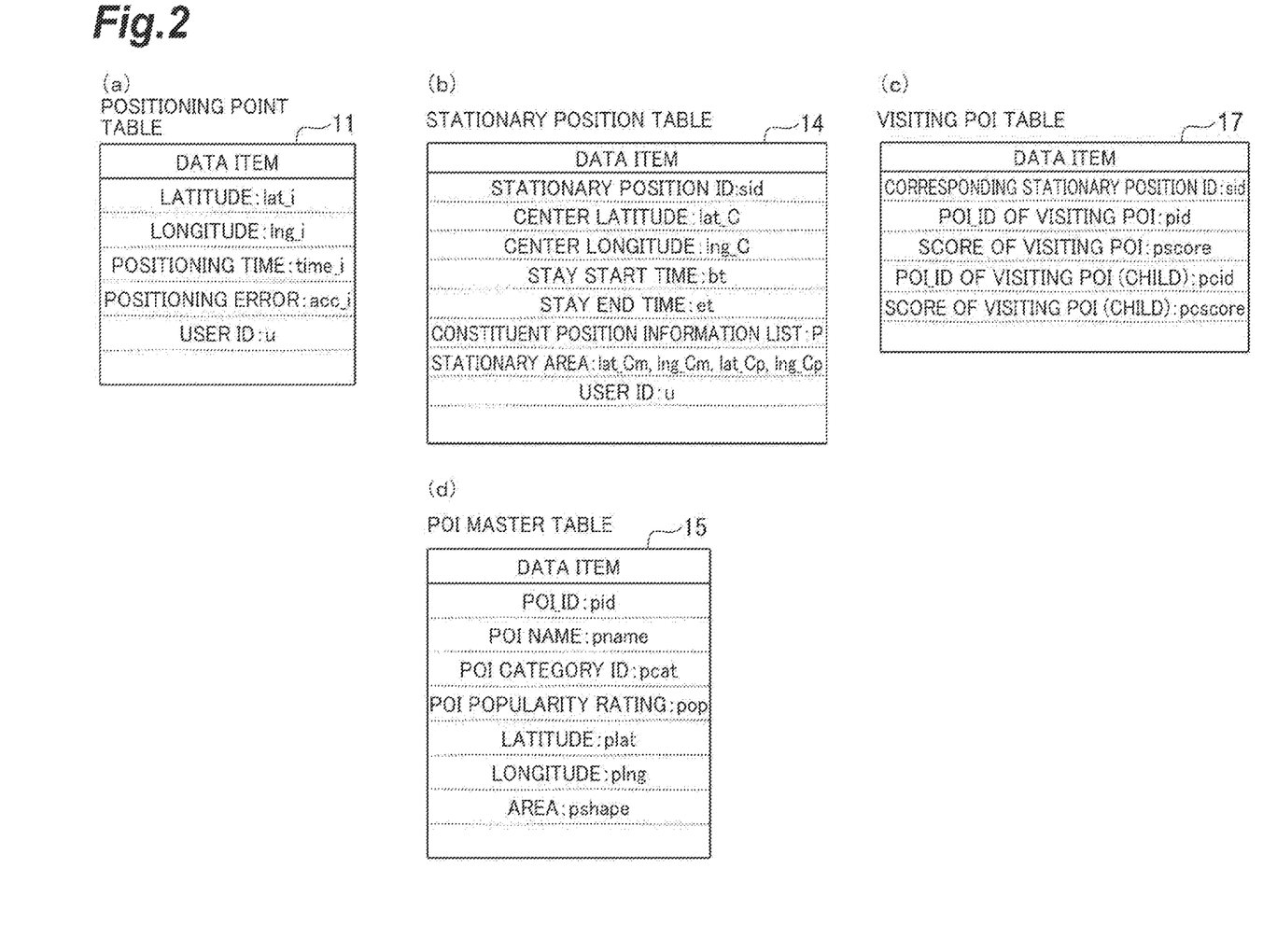
FIG. 2 is a diagram schematically illustrating various tables, where

The positioning point table 11 is a table that stores user position information indicating a position of a user and that stores information such as latitude and longitude indicating the position of the user acquired by positioning, a positioning time at which positioning is performed, a positioning error, and a user ID for identifying the user, for example, as illustrated in FIG. 2(a).

The user position information acquiring unit 12 is a constituent element that acquires user position information from the positioning point table 11 and hands over the user position information to the stationary position deriving unit 13.

The stationary position deriving unit 13 is a constituent element that derives a stationary position which is expressed by an area on the basis of an error and a degree of dispersion of a series of pieces of user position information acquired by the user position information acquiring unit 12.

The stationary position table 14 is a table that stores information on a stationary position of a user and stores, for example, information such as a stationary position ID for identifying a stationary position, center latitude and center longitude indicating a center position of the stationary position, a stay start time and a stay end time of a time period in which the user stays at the stationary position, a constituent position information list for stationary positions, information (for example, latitude and longitude of a northwest corner of a stationary area) indicating a stationary position as an area (a stationary area), and a user ID as illustrated in FIG. 2(b).

The POI master table 15 is a table that stores POI-relevant information on individual POIs which are registered in advance (for example, information on POI positions and POI names) and stores, for example, a POI_ID and a POI name for identifying a POI, a POI category ID indicating a category of a POI, a POI popularity rating indicating a popularity rating of a POI, latitude and longitude indicating a POI position, information on an area representing a building or a site of a POI (for example, geometry data representing a shape correlated with the POI), a parent POI_ID for identifying a parent POI of a POI when there is a parent POI, and a parent POI flag indicating whether a POI is a parent POI as illustrated in FIG. 2(d).

The visiting POI estimating unit 16 is a constituent element that estimates a visiting POI of a user on the basis of a relationship between the stationary position (the stationary area) of the user derived by the stationary position deriving unit 13 and a POI position.

The visiting POI table 17 is a table that stores information on a visiting POI which is acquired through estimation by the visiting POI estimating unit 16 and stores, for example, information such as a corresponding stationary position ID, a POI_ID for identifying a visiting POI, a score of a visiting POI, a POI_ID of a (child) visiting POI for identifying a corresponding child POI (of a parent POI), and a score of a (child) visiting POI as illustrated in FIG. 2(c). "Score" refers to an index indicating a probability of estimating that a candidate POI is a visiting POI in estimating a visiting POI which will be described later.

The visiting destination prediction device 10 does not have to include all of the positioning point table 11, the stationary position table 14, the POI master table 15, and the visiting POI table 17, but one or more tables of these tables may be provided outside the visiting destination prediction device 10 and may transmit and receive information to and from the visiting destination prediction device 10.
[Processes Associated with Visiting Destination Prediction Method]
A process flow associated with estimation of a visiting POI of a user which is performed by the visiting destination prediction device 10 will be described below with reference to FIGS. 3 to 6.

Figure 3:
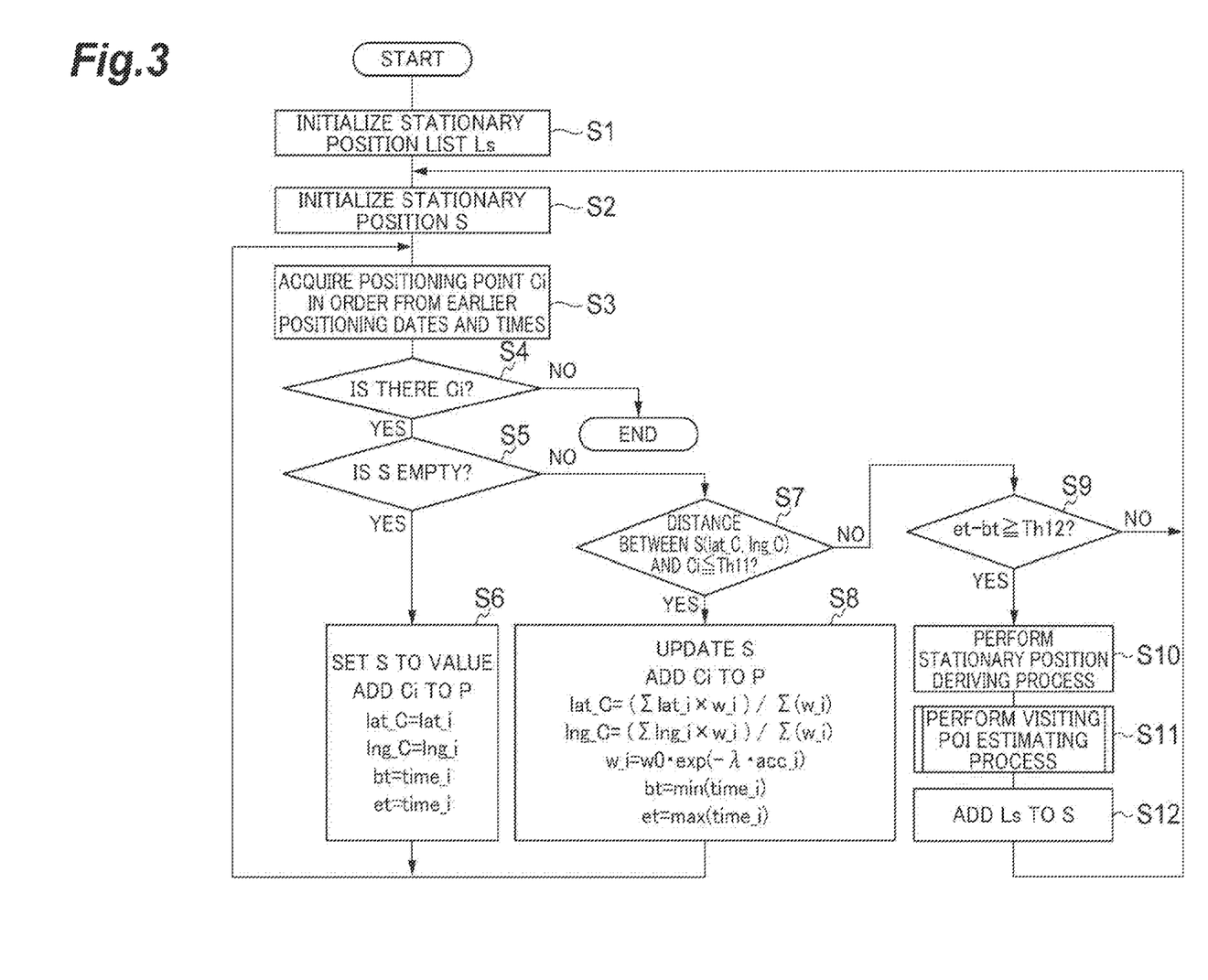
FIG. 3 is a flowchart illustrating a process flow associated with estimation of a visiting POI of a user.
Figure 4:
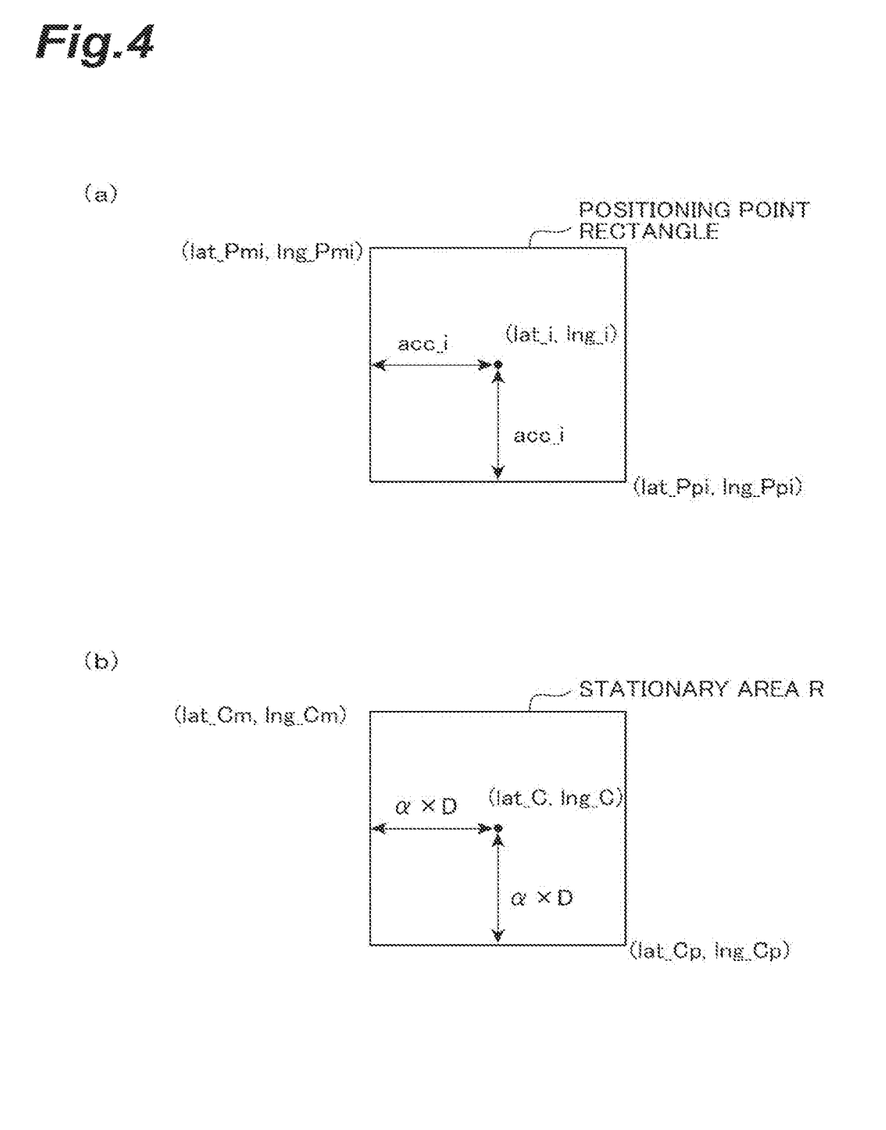
FIG. 4 is a diagram illustrating a stationary position deriving process, where

As illustrated in FIG. 3, first, a stationary position list Ls in which information on visiting POIs acquired by estimation (for example, corresponding stationary position IDs) is stored is initialized (Step S1), and a stationary position S which is used for work in the following processes is initialized (Step S2). This stationary position S is constituted in each column of the stationary position table 14 illustrated in FIG. 2(b).

Then, the stationary position deriving unit 13 acquires a positioning point Ci which is user position information of a target user in order from earlier positioning dates and times (Step S3). At this time, for example, the user position information acquiring unit 12 may acquire all the positioning points Ci of the target user from the positioning point table 11 and transmit the positioning points Ci to the stationary position deriving unit 13 in order from earlier positioning dates and times.

Then, the stationary position deriving unit 13 ascertains the presence of the positioning points Ci and ends the process flow when there is no positioning point Ci (that is, when there is no non-processed user position information of the target user (when the determination result of Step S4 is negative)). On the other hand, when there is a positioning point Ci, the stationary position deriving unit 13 determines whether the stationary position S at that time is empty (an initialized state) in Step S5.

When it is determined in Step S5 that the stationary position S is empty, the stationary position deriving unit 13 adds information associated with the positioning point Ci to the constituent position information list P at the stationary position S (that is, sets the stationary position S to a value). Specifically, the stationary position deriving unit 13 registers information such as stationary area center latitude lat_C, stationary area center longitude lng_C, a stay start time bt, and a stay end time et at the stationary position S by Expressions (1-1) to (1-4) using the latitude lat_i and longitude lng_i of the positioning point Ci and a positioning time time_i (Step S6).

$$lat\_C = lat\_i \qquad (1\text{-}1)$$

$$lng\_C = lng\_i \qquad (1\text{-}2)$$

$$bt = time\_si \qquad (1\text{-}3)$$

$$et = time\_i \qquad (1\text{-}4)$$

Thereafter, a new positioning point Ci is acquired again in Step S3.

On the other hand, when it is determined in Step S5 that the stationary position S is not empty, the process flow progresses to Step S7 and the stationary position deriving unit 13 determines whether a distance between the stationary area center position S (lat_C, lng_C) acquired from the stationary area center latitude lat_C and the stationary area center longitude lng_C registered at the stationary position S and the new positioning point Ci is equal to or less than a predetermined threshold value Th11 for determining whether the new positioning point is to be registered in the constituent position information list P at the stationary position S (Step S7). The threshold value Th11 is a constant threshold value such as 150 m. Here, when a positioning error acc_i is equal to or greater than the threshold value Th11, the value of the positioning error acc_i may be used as the threshold value Th11. This is for avoiding a problem of a stationary position being divided by a positioning point acquired in a state in which the positioning error acc_i is great.

Here, when the distance between the center position S (lat_C, lng_C) and the new positioning point Ci is equal to or less than the threshold value Th11, it can be determined that the new positioning point is to be registered in the constituent position information list P at the stationary position S and thus the stationary position deriving unit 13 adds information associated with the new positioning point Ci to the constituent position information list P at the stationary position S (that is, the stationary position S is updated) in Step S8. Specifically, the stationary position deriving unit 13 updates information such as the stationary area center latitude lat_C, the stationary area center longitude lng_C, the stay start time bt, and the stay end time et at the stationary position S by Expressions (2-1) to (2-5) using the latitude lat_i, the longitude lng_i, the positioning time time_i, and the positioning error acc_i of the positioning point Ci. Here, w_i which is used in Expressions (2-1) and (2-2) is obtained by Expression (2-3). In Expression (2-3), w0 is a coefficient of 1.0 or the like and λ denotes a coefficient of 0.0046 or the like.

$$lat\_C = (\Sigma lat\_i \times w\_i)/(w\_i) \quad (2\text{-}1)$$

$$lng\_C = (\Sigma lng\_i \times w\_i)/(w\_i) \quad (2\text{-}2)$$

$$w\_i = w0 \times \exp(-\lambda \times acc\_i) \quad (2\text{-}3)$$

$$bt = \min(time\_i) \quad (2\text{-}4) \text{ (“min” indicates a minimum value)}$$

$$et = \max(time\_i) \quad (2\text{-}5) \text{ (“max” indicates a maximum value)}$$

After Step S8 has been performed, a new positioning point Ci is acquired again in Step S3.

On the other hand, when it is determined in Step S7 that the distance between the center position S (lat_C, lng_C) and the new positioning point Ci is not equal to or less than the threshold value Th11, it can be determined that the new positioning point is not to be registered in the constituent position information list P at the stationary position S and thus the stationary position deriving unit 13 determines whether a stay time (that is, a time period elapsing from the stay start time bt to the stay end time et) is equal to or greater than a predetermined threshold value Th12 for excluding temporary stops other than a visit to the POI in Step S9. Here, when the stay time is not equal to or greater than the threshold value Th12, it can be determined that a temporary stop other than a visit to the POI occurs and the POI is not a visiting POI. Accordingly, the process flow returns to Step S2 and initialization of a stationary position S (Step S2) and the processes subsequent thereto are performed again.

On the other hand, when it is determined in Step S9 that the stay time is equal to or greater than the threshold value Th12, it can be determined that a temporary stop other than a visit to the POI does not occur and the POI is a visiting POI. Accordingly, the process flow progresses to Step S10 and the stationary position deriving unit 13 performs a stationary position deriving process which will be described later, and then the visiting POI estimating unit 16 performs a visiting POI estimating process on the basis of a relationship between the stationary position (a stationary area) of the user derived by the stationary position deriving unit 13 and the POI position (Step S11). The visiting POI estimating process will be described later in detail with reference to FIG. 5. Thereafter, the visiting POI estimating unit 16 adds the stationary position S to the stationary position list Ls (Step S12), and the process flow returns to Step S2 and initialization of a stationary position S (Step S2) and the processes subsequent thereto are performed again.

The stationary position deriving process of Step S10 in FIG. 3 will be described below.

In Step S10 of FIG. 3, first, as a premise, a positioning point Pi belonging to the constituent position information list P of the stationary position S is considered as a rectangle with a radius of the positioning error acc_i (specifically, a rectangle (hereinafter, also referred to as a "positioning point rectangle") which is acquired by extending the position of the positioning point Pi (latitude lat_i, lng_i) by the positioning error acc_i north and south in the latitude direction and extending the position of the positioning point Pi by the positioning error acc_i east and west in the longitude direction) as illustrated in FIG. 4(a). Here, as illustrated in FIG. 4(a), northwest corner coordinates in the positioning point rectangle are set to (lat_Pmi, lng_Pmi), southeast corner coordinates are set to (lat_Ppi, lng_Ppi), and a weight value is set to w_i. In this embodiment, both a positioning point and a stationary position which will be described later are considered as rectangular areas, but the invention is not limited thereto. For example, (1) both the positioning point and the stationary position may be considered as areas other than rectangular areas (for example, circular areas), (2) the positioning point may be considered as a rectangular area and the stationary position may be considered as an area other than a rectangular area (for example, a circular area), or (3) the stationary position may considered as a rectangular area and the positioning point may be considered as an area other than a rectangular area (for example, a circular area).

In the stationary position deriving process, as a first step, the stationary position deriving unit 13 calculates a weighted average D of "distances" between the stationary position center and farthest corners of the positioning point rectangles (vertices of the rectangles) using Expression (3).

$$D = (\Sigma[\text{Max}(|lat\_C - lat\_Pmi|, |lat\_C - lat\_Ppi|, |lng\_C - lng\_Pmi|, |lng\_c - lng\_Ppi|) \times w\_i])/[w\_i] \quad (3) \text{ (“Max” denotes a maximum value)}$$

The weight value w_i is a weight value obtained from Expression (2-3) and corresponds to a negative exponential function for the positioning error acc_i. The method of calculating the weighted average D is an example, and another example will be described later.

Then, as a second step, the stationary position deriving unit 13 calculates a rectangle which is obtained by extending the stationary area center position (latitude lat_C, longitude lng_C) by (a coefficient α×weighted average D) north and south in the latitude direction and extending the stationary area center position by (a coefficient α×weighted average D) east and west in the longitude direction as a stationary area R as illustrated in FIG. 4(b). The coefficient α is a coefficient with a value of as 0.5 or the like.

In this way, the stationary area R indicating a stationary position is acquired in Step S10 of FIG. 3. Through the above-mentioned processes, w_i decreases as the positioning error acc_i of each positioning point increases. Accordingly, the weighted average D increases and the stationary area is enlarged.

The visiting POI estimating process of Step S11 of FIG. 3 will be described below with reference to FIG. 5.

Figure 5:
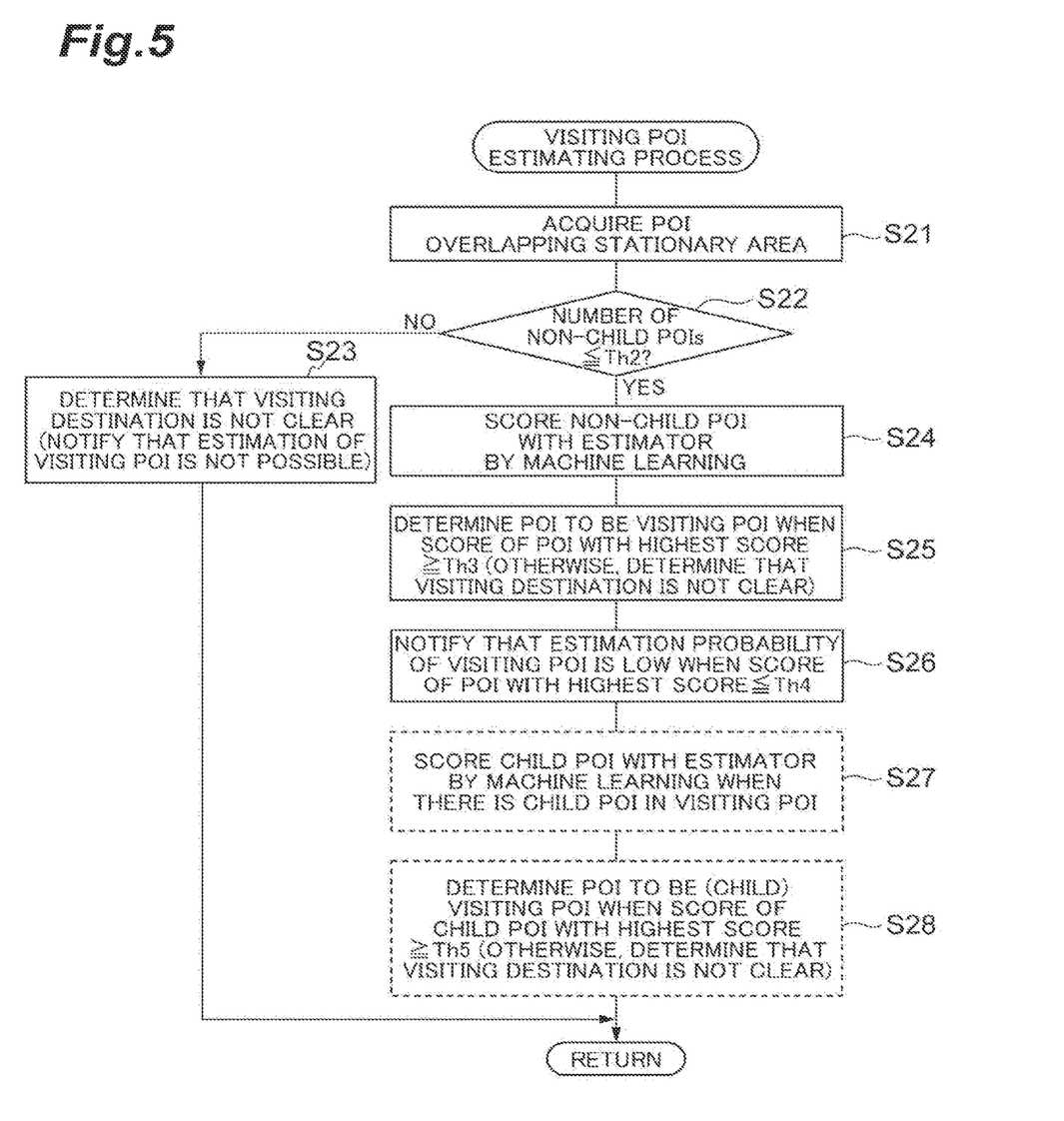
FIG. 5 is a flowchart illustrating subroutines of a visiting POI estimating process.
Figure 6:
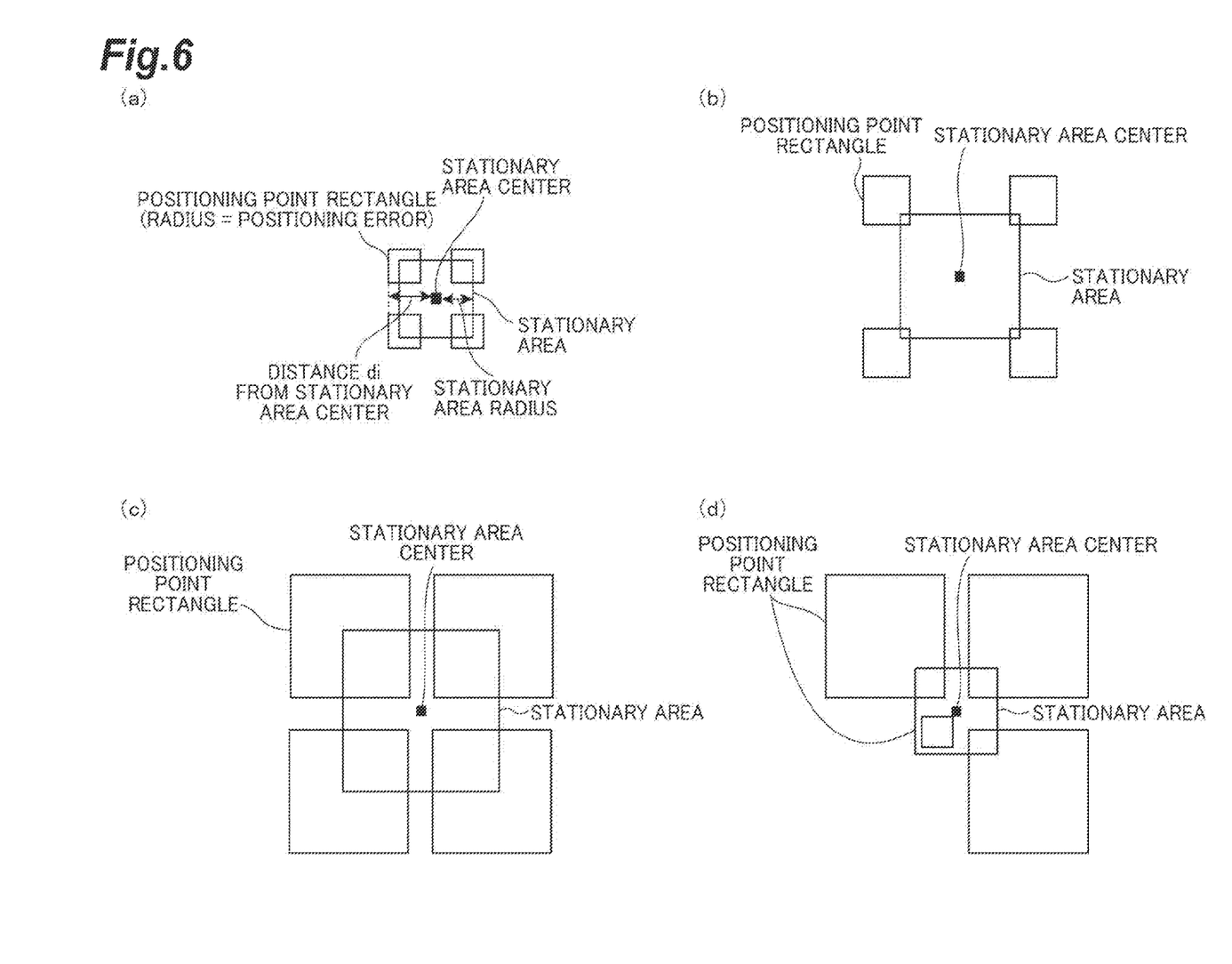
FIG. 6 is a diagram illustrating advantageous effects in the embodiment of the invention, where

The visiting POI estimating unit 16 acquires a POI overlapping the stationary area on the assumption that a POI position overlaps the stationary position (the stationary area R) of the user derived in Step S10 of FIG. 3 (Step S21 of FIG. 5).

Here, it is determined whether the number of non-child POIs (that is, parent POIs or POIs that are neither parent POIs nor child POIs) out of the acquired POIs is equal to or less than a predetermined threshold value Th2 for narrowing determination (Step S22). When the number of non-child POIs is equal to or less than the threshold value Th2, it is determined that narrowing is possible and thus the process flow progresses to Step S24. For example, a value such as 10 can be employed as the threshold value Th2. On the other hand, when the number of non-child POIs is greater than the threshold value Th2, it is determined that narrowing is not possible and it is determined that a visiting destination is not clear (Step S23). In Step S23, for example, the visiting POI estimating unit 16 notifies an operator that estimation of the visiting POI is not possible.

In Step S24, scoring based on estimation by machine learning is performed on the non-child POIs. Here, scoring according to the related art may be employed.

Then, the visiting POI estimating unit 16 determines whether the score of a POI with the highest score in the result of scoring is equal to or greater than a predetermined threshold value Th3 for determination of a visiting POI, and determines that the POI with the highest score is the visiting POI when the score of the POI with the highest score is equal to or greater than the threshold value Th3 (Step S25). When a maximum value of the score is 100, for example, a value such as 50 may be employed as the threshold value Th3. When the score of the POI with the highest score is less than the threshold value Th3, it can be determined that the POI with the highest score is not the visiting POI. Accordingly, similarly to Step S23, it is determined that the visiting destination is not clear and, for example, the visiting POI estimating unit 16 notifies the operator that estimation of the visiting POI is not possible. The threshold value Th3 corresponds to a "second reference value" in the appended claims.

Then, the visiting POI estimating unit 16 determines whether the score of the POI with the highest score is equal to or less than a predetermined threshold value Th4 for determining whether an estimation probability is lower than a normal value. When the score of the POI with the highest score is equal to or less than the threshold value Th4, for example, the visiting POI estimating unit 16 notifies the operator that the estimation probability of the visiting POI is low (Step S26). The threshold value Th4 corresponds to a "first reference value" in the claims.

When there is a child POI in the visiting POI, Steps S27 and S28 are performed. That is, the visiting POI estimating unit 16 performs scoring based on estimation by machine learning on the present child POI (Step S27). Here, scoring according to the related art may be employed.

Then, the visiting POI estimating unit 16 determines whether the score of the POI with the highest score in the result of scoring is equal to or greater than a predetermined threshold value Th5 for determination of a visiting POI, and determines that the child POI with the highest score is the visiting POI (child) when the score of the POI with the highest score is equal to or greater than the threshold value Th5 (Step S28). When the score of the child POI with the highest score is less than the threshold value Th5, it is determined that a visiting destination is not clear similarly to Step S23, and the visiting POI estimating unit 16 notifies the operator that estimation of a visiting POI (child) is not possible.

According to the embodiment described above, since a stationary position (a stationary area) which is expressed by an area is derived on the basis of an error and a degree of dispersion of a series of pieces of the acquired user position information (positioning points) and a visiting POI is estimated on the basis of the relationship between the stationary area and the POI positions, it is possible to avoid a problem when a stationary position of a user is considered as a point and nearby facilities are extracted as candidates for the visiting POI like the related art and to more accurately estimate the visiting POI.

The technique of deriving a stationary position (a stationary area) in consideration of a "degree of dispersion" of positioning points in addition to an "error" of the positioning points will be additionally described below with reference to FIGS. 6(a) to 6(d). As a premise, as illustrated in FIG. 6(a), it is assumed that a rectangle obtained by extending the stationary area center by a stationary area radius north and south in the latitude direction and extending the stationary area center by the stationary area radius east and west in the longitude direction is a stationary area and positioning point rectangles are located in the vicinity of four corners (the northeast corner, the northwest corner, the southeast corner, and the southwest corner) of the stationary area. As described above, the positioning point rectangle is a rectangle with the positioning error as a radius centered on the positioning point (that is, a rectangle obtained by extending the positioning point by the positioning error north and south in the latitude direction and extending the positioning point by the positioning error east and west in the longitude direction).

FIG. 6(b) illustrates a state in which the positioning error is small and the degree of dispersion of the positioning points is large, where the weighted average D increases and the stationary area is enlarged as the degree of dispersion of the positioning points increases. In this case, a user is predicted to stroll in a wide area.

FIG. 6(c) illustrates a state in which the degree of dispersion of the positioning points is the same as illustrated in FIG. 6(b) and the positioning error is greater than that in FIG. 6(b), where the weighted average D increases and the stationary area is enlarged as the positioning error increases even when the degree of dispersion of the positioning points is the same. When the stationary area is enlarged, it is difficult to specify a range of the stationary position.

FIG. 6(d) illustrates a state in which positioning points with different positioning errors are mixed, where only the positioning point rectangle in the vicinity of the southwest corner of the stationary area (the left-lower end in FIG. 6(d)) is smaller than the other positioning point rectangles. In this case, as can be apparently understood from the result of comparison with FIG. 6(c), the stationary area is lessened. That is, since the weight value w_i which is used to calculate the weighted average D corresponds to a negative exponential function for the positioning error acc_i as expressed by Expression (2-3), it can be seen that the size of the stationary area is strongly affected by the positioning point with a small positioning error.

As described above, the stationary position (the stationary area) is derived in consideration of the degree of dispersion of the positioning points in addition to the error of the positioning points.

According to this embodiment, since the visiting POI estimating unit 16 estimates the visiting POI on the basis of the score for each POI indicating a probability of estimation of the visiting POI and decreasing as the number of POIs with a small distance from the stationary position of the user increases at the time of estimation of a visiting POI on the basis of a relationship between the stationary position of the user and the POI position, it is possible to more accurately estimate the visiting POI on the basis of the score in consideration of a situation in which the estimation probability decreases (a situation in which the number of POIs with a small distance from the stationary position is great).

The visiting POI estimating unit 16 sets a POI with the highest score as a visiting POI, and notifies that the estimation probability of the visiting POI is low when the highest score is equal to or less than a predetermined first reference value (the threshold value Th4 in Step S26 of FIG. 5). The visiting POI estimating unit 16 notifies that estimation of the visiting POI is not possible when there is no POI in which the score is equal to or greater than a predetermined second reference value (the threshold value Th3 in Step S25 of FIG. 5). In this way, it is possible to appropriately notify a user of a state in which the estimation probability of the visiting POI is low and a state in which in which estimation of the visiting POI is not possible.

Other calculation methods may be employed as the method of calculating the weighted average D within a range in which characteristics that "w_i decreases as the positioning error acc_i of each positioning point increases and thus the weighted average D increases and the stationary area is enlarged" can be maintained. For example, a weighted average D1 of largest distances north from the stationary area center position, a weighted average D2 of largest distances south from the stationary area center position, a weighted average D3 of largest distances east from the stationary area center position, and a weighted average D4 of largest distances west from the stationary area center position may be calculated on the basis of the positional relationship between the rectangular areas associated with the positioning points and the stationary area center position (latitude lat_C, longitude lng_C), and an area obtained by extending the stationary area center position by a width correlated with the weighted average D1 (coefficient α×weighted average D1) north, extending the stationary area center position by a width correlated with the weighted average D2 (coefficient α×weighted average D2) south, extending the stationary area center position by a width correlated with the weighted average D3 (coefficient α×weighted average D3) east, and extending the stationary area center position by a width correlated with the weighted average D4 (coefficient α×weighted average D4) west may be derived as the stationary position (the stationary area).

The block diagram which is used above for description of the embodiment illustrates blocks of functional units. Such functional blocks (functional units) are realized by an arbitrary combination of hardware and/or software. A means for realizing each functional block is not particularly limited. That is, each functional block may be realized by a single device which is physically and/or logically combined or may be realized by two or more devices which are physically and/or logically separated and which are directly and/or indirectly linked to each other (for example, in a wired and/or wireless manner).

Figure 7:
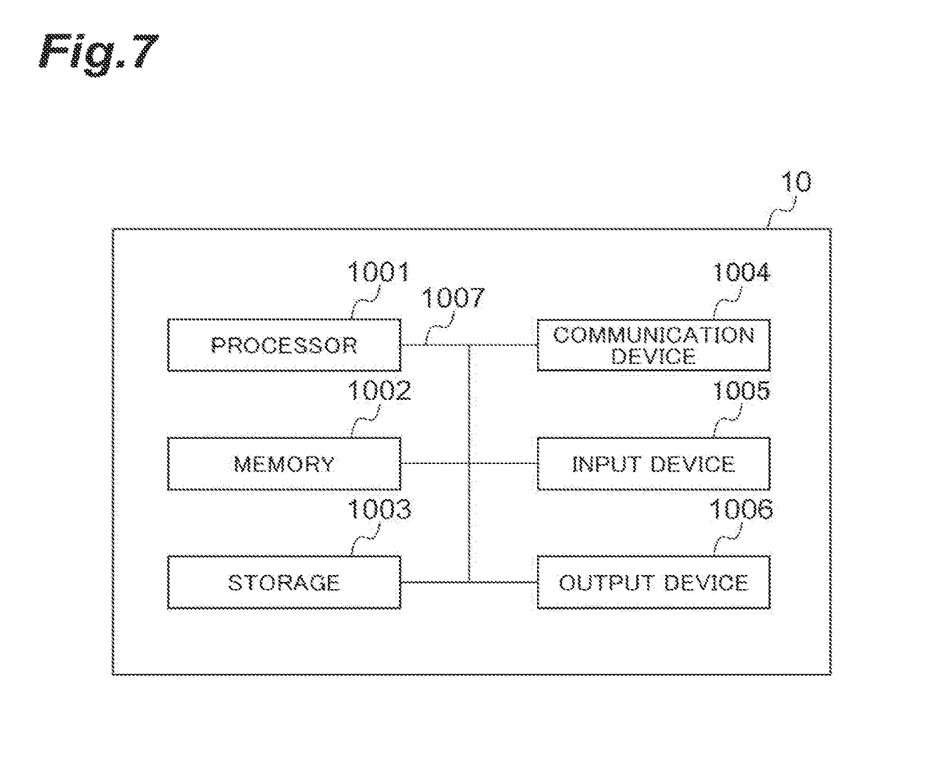
FIG. 7 is a diagram illustrating an example of a hardware configuration of the visiting destination prediction device.

For example, the visiting destination prediction device 10 according to the embodiment may serve as a computer that performs the processes of the visiting destination prediction device 10. FIG. 7 is a diagram illustrating an example of a hardware configuration of the visiting destination prediction device 10. The visiting destination prediction device 10 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware of the visiting destination prediction device 10 may be configured to include one or more devices illustrated in the drawing or may be configured to exclude some devices thereof.

The functions of the visiting destination prediction device 10 can be realized by reading predetermined software (program) to the hardware such as the processor 1001 and the memory 1002 and causing the processor 1001 to execute arithmetic operations and to control communication using the communication device 1004 and reading and/or writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. For example, the functional units of the visiting destination prediction device 10 may be realized by the processor 1001.

The processor 1001 reads a program (a program code), a software module, data, or the like from the storage 1003 and/or the communication device 1004 to the memory 1002 and performs various processes in accordance therewith. As the program, a program that causes a computer to perform at least some of the operations described in the above-mentioned embodiment is used. For example, the functional units of the visiting destination prediction device 10 may be realized by a control program which is stored in the memory 1002 and which operates in the processor 1001, and the other functional blocks may be realized in the same way. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RANI). The memory 1002 may be referred to as a register, a cache, a main memory (a main storage device), or the like. The memory 1002 can store a program (a program code), a software module, and the like that can be executed to perform the method according to one embodiment of the invention.

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage mediums may be, for example, a database, a server, or another appropriate medium including the memory 1002 and/or the storage 1003.

The communication device 1004 is hardware (a transmission and reception device) that performs communication between computers via a wired and/or wireless network and is also referred to as, for example, a network device, a network controller, a network card, or a communication module. For example, the functional units of the visiting destination prediction device 10 may be realized by the communication device 1004 in addition.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The visiting destination prediction device 10 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be mounted as at least one piece of hardware.

While an embodiment of the invention has been described above in detail, it will be apparent to those skilled in the art that the invention is not limited to the embodiment described in this specification. The invention can be altered and modified in various forms without departing from the gist and scope of the invention defined by description in the appended claims. Accordingly, the description in this specification is for exemplary explanation and does not have any restrictive meaning for the invention.

The order of processing sequences, sequences, flowcharts, and the like of the aspects/embodiments described above in this specification may be changed as long as no technical contradictions arise. For example, in the method described in this specification, various steps are described as elements of an exemplary sequence, but the method is not limited to the described sequence.

Information or the like which is input and output may be stored in a specific place (for example, a memory) or may be managed in a management table. The information or the like which is input and output may be overwritten, updated, or added. The information or the like which is output may be deleted. The information or the like which is input may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

Regardless of whether it is called software, firmware, middleware, microcode, hardware description language, or another name, software can be widely construed to refer to commands, a command set, codes, code segments, program codes, a program, a sub program, a software module, an application, a software application, a software package, a routine, a sub routine, an object, an executable file, an execution thread, a sequence, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology is included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Information, parameters, and the like which are described in this specification may be expressed by absolute values, may be expressed by values relative to a predetermined value, or may be expressed by other corresponding information.

A mobile communication terminal may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

The term, "determining" or "determination," which is used in this specification may include various types of operations. The term, "determining" or "determination," may include, for example, cases in which judging, calculating, computing, processing, deriving, investigating, looking up (for example, looking up in a table, a database, or another data structure), and ascertaining are considered to be "determined." The term, "determining" or "determination," may include cases in which receiving (for example, receiving information), transmitting (for example, transmitting information), input, output, and accessing (for example, accessing data in a memory) are considered to be "determined." The term, "determining" or "determination," may include cases in which resolving, selecting, choosing, establishing, comparing, and the like are considered to be "determined." That is, the term, "determining" or "determination," can include cases in which a certain operation is considered to be "determined."

The expression "on the basis of," as used in this specification, does not mean "on the basis of only" unless otherwise described. In other words, the expression "on the basis of" means both "on the basis of only" and "on the basis of at least."

When the terms, "include," "including," and modifications thereof are used in this specification or the appended claims, the terms are intended to have a comprehensive meaning similar to the term "comprising." The term "or" which is used in this specification or the claims is not intended to mean an exclusive logical sum.

In this specification, two or more of any devices may be included unless the context or technical constraints dictate that only one device is included. In the entire present disclosure, singular terms include plural referents unless the context or technical constraints dictate that a unit is singular.

REFERENCE SIGNS LIST

10 . . . Visiting destination prediction device, 11 . . . Positioning point table, 12 . . . User position information acquiring unit, 13 . . . Stationary position deriving unit, 14 . . . Stationary position table, 15 . . . POI master table, 16 . . . Visiting POI estimating unit, 17 . . . Visiting POI table, 1001 . . . Processor, 1002 . . . Memory, 1003 . . . Storage, 1004 . . . Communication device, 1005 . . . Input device, 1006 . . . Output device, 1007 . . . Bus

The invention claimed is:

1. A visiting destination prediction device comprising circuitry configured to:
   acquire user position information indicating a position of a user;
   derive a stationary position of the user on the basis of the acquired user position information; and
   estimate a visiting POI which is a visiting destination of the user on the basis of a relationship between the derived stationary position of the user and a predetermined POI position of a POI which is able to be the visiting destination of the user,
   wherein the circuitry is configured to derive the stationary position which is expressed by an area on the basis of an error and a degree of dispersion of a series of pieces of the acquired user position information, and
   wherein the circuitry is configured to:
   acquire a stationary point center position from the series of pieces of the acquired user position information through a predetermined averaging process;
   calculate a weighted average of distances between areas associated with positioning points and the stationary point center position when a positioning point acquired from one piece of user position information is defined as a first area which is acquired by extending a point which is indicated by the user position information by the error of the user position information north and south in the latitude direction and extending the point by the error east and west in the longitude direction; and
   derive a second area which is acquired by extending the stationary point center position by a width correlated with the weighted average north and south in the latitude direction and extending the stationary point center position by the width east and west in the longitude direction as the stationary position.

2. The visiting destination prediction device according to claim 1, wherein the circuitry is configured to calculate the weighted average on the basis of a calculation method including calculation of multiplying a distance between the first area correlated with each positioning point and the stationary point center position by a weight value corresponding to a negative exponential function for the error of the user position information correlated with each positioning point.

3. The visiting destination prediction device according to claim 2, wherein the circuitry is configured to calculate the weighted average of largest distances between the areas correlated with the positioning points and the stationary point center position at the time of calculating the weighted average.

4. The visiting destination prediction device according to claim 1, wherein the circuitry is configured to calculate the weighted average of largest distances between the areas correlated with the positioning points and the stationary point center position at the time of calculating the weighted average.

5. A visiting destination prediction device comprising circuitry configured to:
   acquire user position information indicating a position of a user;
   derive a stationary position of the user on the basis of the acquired user position information; and
   estimate a visiting POI which is a visiting destination of the user on the basis of a relationship between the derived stationary position of the user and a predetermined POI position of a POI which is able to be the visiting destination of the user,
   wherein the circuitry is configured to derive the stationary position which is expressed by an area on the basis of an error and a degree of dispersion of a series of pieces of the acquired user position information, and
   wherein the circuitry is configured to estimate the visiting POI on the basis of a score of each POI indicating a probability of estimation of a visiting POI at the time of estimating the visiting POI based on a relationship between the stationary position of the user and the POI position, wherein the score of each POI decreases as the number of POIs with a small distance from the stationary position of the user increases.

6. The visiting destination prediction device according to claim 5, wherein the circuitry is configured to notify that the estimation probability of a visiting POI is low when the score of a POI with the highest score is less than a predetermined first reference value.

7. The visiting destination prediction device according to claim 5, wherein the circuitry is configured to notify that estimation of a visiting POI is not possible when there is no POI with a score equal to or greater than a second reference value.

* * * * *